United States Patent [19]
Judd et al.

[11] Patent Number: 5,768,623
[45] Date of Patent: Jun. 16, 1998

[54] SYSTEM AND METHOD FOR SHARING MULTIPLE STORAGE ARRAYS BY DEDICATING ADAPTERS AS PRIMARY CONTROLLER AND SECONDARY CONTROLLER FOR ARRAYS RESIDE IN DIFFERENT HOST COMPUTERS

[75] Inventors: Ian David Judd, Winchester; Nik Shaylor, Southampton, both of United Kingdom; Alistair Leask Symon, San Jose, Calif.

[73] Assignee: International Business Machines Corporation, Armonk, N.Y.

[21] Appl. No.: 531,239

[22] Filed: Sep. 19, 1995

[51] Int. Cl.⁶ .............................. H04L 1/22; G06F 13/14
[52] U.S. Cl. .................. 395/857; 395/182.03; 395/837; 395/858; 395/894; 711/114
[58] Field of Search ..................... 395/856, 857, 395/858, 894, 311, 441, 610, 280, 182.03; 711/114, 837

[56] References Cited

U.S. PATENT DOCUMENTS

| | | | |
|---|---|---|---|
| 3,693,161 | 9/1972 | Price et al. | 395/858 |
| 4,133,029 | 1/1979 | Ruckdeschel et al. | 395/858 |
| 4,207,609 | 6/1980 | Luiz et al. | 395/858 |
| 4,396,984 | 8/1983 | Videki, II | 395/858 |
| 4,455,605 | 6/1984 | Cormier et al. | 395/858 |
| 4,747,047 | 5/1988 | Coogan et al. | 364/200 |
| 4,777,595 | 10/1988 | Strecker et al. | 364/200 |
| 5,237,658 | 8/1993 | Walker et al. | 395/858 |
| 5,280,586 | 1/1994 | Kunz et al. | 395/275 |
| 5,337,414 | 8/1994 | Hashemi et al. | 395/275 |
| 5,386,517 | 1/1995 | Sheth et al | 395/275 |
| 5,404,452 | 4/1995 | Detschel et al. | 395/250 |
| 5,511,169 | 4/1996 | Suda | 395/280 |
| 5,546,535 | 8/1996 | Stallmo et al. | 395/182.07 |
| 5,553,230 | 9/1996 | Petersen et al. | 395/280 |

OTHER PUBLICATIONS

Grean, Rick "Share your IBM PC hard disk drive with a Mac" Byte Feb. 1988 v13 n2 p. 89, CD. Computer Library Periodicals, Jan. 1989.

Patterson et al. "A case for Redundant Arrays of Inexpensive Disks (RAID)", proceedings of the 1988 ACM Sigmond Conference on Management of Data, Chicago, Illinois, Jun. 1988.

Information Technology—Serial Storage Architecture—Transport Layer 1 (SSA–TL1), X3T10.1/0989D, Rev. 7b, Oct. 9, 1995.

Information Technology—Serial Storage Architecture—SCSI–2 Protocol (SSA–S2P), X3T10.1/1121D, Rev. 4, Sep. 13, 1995.

Information Technology—Serial Storage Architecture—Physical Layer 1 (SSA–PH1), Rev. 6b, Oct. 8, 1995.

*Primary Examiner*—Dinh C. Dung
*Attorney, Agent, or Firm*—Esther E. Klein

[57] ABSTRACT

A system is provided for storing data for a plurality of host computers on a plurality of storage arrays so that data on each storage array can be accessed by any host computer. A plurality of adapter cards are used. Each adapter has controller functions for a designated storage array. There is an adapter communication interface (interconnect) between all of the adapters in the system. There is also a host application interface between an application program running in the host computer and an adapter. When a data request is made by an application program to a first adapter through a host application interface for data that is stored in a storage array not primarily controlled by the first adapter, the data request is communicated through the adapter communication interface to the adapter primarily controlling the storage array in which the requested data is stored.

12 Claims, 8 Drawing Sheets

SYSTEM AND METHOD FOR SHARING MULTIPLE STORAGE ARRAYS BY DEDICATING ADAPTERS AS PRIMARY CONTROLLER AND SECONDARY CONTROLLER FOR ARRAYS RESIDE IN DIFFERENT HOST COMPUTERS

FIELD OF THE INVENTION

This invention relates to data storage systems and more particularly to multiple storage systems shared by multiple host systems.

BACKGROUND OF THE INVENTION

The growth of computer use has created an increasing demand for flexible, high availability systems to store data for the computer systems. Many enterprises have a multiplicity of host computer systems including personal computers and workstations that either function independently or are connected through a network. It is desirable for the multiple host systems to be able to access a common pool of multiple storage systems so that the data can be accessed by all of the host systems. Such an arrangement increases the total amount of data available to any one host system. Also, the work load can be shared among the hosts and the overall system can be protected from the failure of any one host.

It is also important to protect the availability of the data stored in the storage systems. One scheme for protecting data is to incorporate RAID (Redundant Array of Independent Disks) functions. The concepts and variations of RAID technology are well known in the storage industry. The levels of RAID are described in Patterson et al., "A Case for Redundant Arrays of Inexpensive Disks (RAID)", proceedings of the 1988 ACM SIGMOND Conference on Management of Data, Chicago, Ill., June, 1988. A typical RAID system includes a RAID controller and a plurality of storage devices, such as direct access storage devices (DASDs), also referred to as disk drives, organized as an array. Data is protected on the system using parity information which is also stored as part of the array. A RAID level 0 array typically refers to an array where data is striped across all of the DASDs but there is no parity protection. A RAID 1 system has the data from one DASD mirrored on a second DASD for the redundancy protection. In a RAID 5 architecture, efficiency and reliability of RAID operations is increased by designating a logical parity disk. This logical parity disk is physically striped across each of the disks on the array so that no one disk contains the parity for the entire array. A JBOD (just a bunch of disks) typically refers to an array of DASDs without striping or redundancy. There are certain operations where each level, RAID 0, RAID 1, RAID 3, and RAID 5 may be more desirable. For example, RAID 5 is preferable for systems which require a large number of concurrent accesses to the data.

It is also desirable for storage systems to include a cache which is either a read cache or a write cache. Also well known in the industry, is providing a non-volatile cache where data written to this cache is considered as if it was written to the disk without having to wait for the disk accesses and the actual writing of the data to the disk itself.

It is also desirable to provide redundant paths to protect against hardware failures so that performance and high availability can be guaranteed for the data accesses.

Previous solutions for allowing multiple hosts to access multiple computer systems have used a combination of host adapter cards, out board disk controllers, and standard network communication systems.

Figure 1:
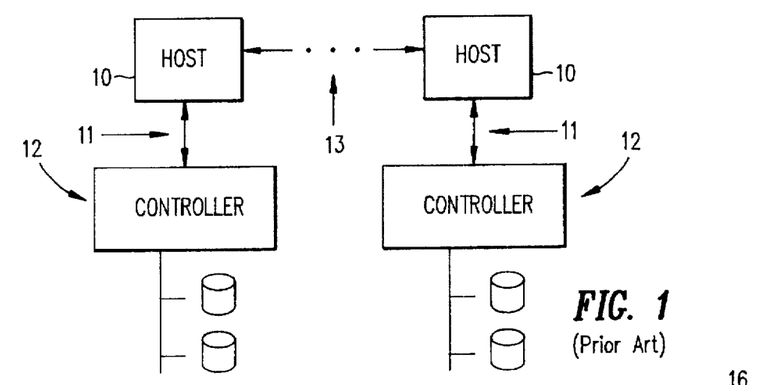
FIG. 1 is a block diagram of a prior art system for providing multiple hosts access to multiple arrays.
Figure 2:
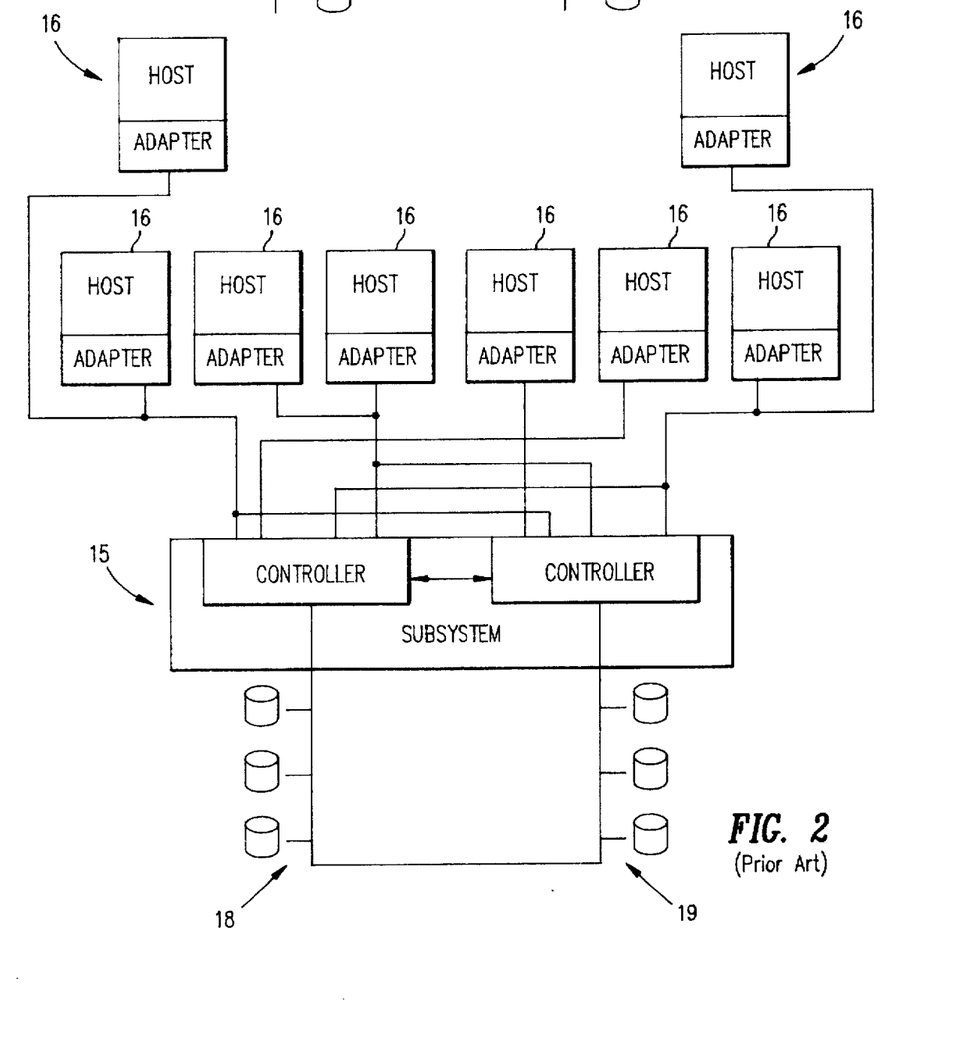
FIG. 2 is a block diagram of a second prior art system for providing multiple hosts access to multiple arrays.

Examples of prior networked computer storage system configurations for allowing multiple hosts to access multiple storage arrays are shown in FIGS. 1 and 2. FIG. 1 shows a system with multiple host systems 10. Each host system has its own interface 11 into a disk array 12. The host systems are in communication with each other through a network 13 and a network file system such as the Network File System (NFS) from Sun Microsystems. If a host needs to access data which is connected to and controlled by a different host system, the request for the data access is routed through the network server to the host controlling the array where the data is stored. There are limitations in this solution because of the slowness of sending the request. Also, the use of the network time is inappropriate for this type of operations and is instead needed for other types of communications between the hosts. Also, the network is not optimized for this type of data access.

FIG. 2 shows a system where a separate controller subsystem 15 is accessible by a plurality of hosts 16. The controller subsystem provides the control functions for the arrays 18, 19 that are attached to the subsystem. These functions include the parity and striping function of RAID, the read cache functions and the non-volatile write cache functions. A host 16 has access to the data through the shared controller. A host sends a request through either controller which accesses the array and sends the requested data back to the host. However, the system shown in FIG. 2 has a number of limitations. There is a limitation on the number of host computers that can be connected into one subsystem and there is a limitation on the number of arrays that are controlled by the subsystem. Also, the prior art shown in FIG. 2 has a separate level of control apparatus between the host and the arrays so that the host is not self contained in having its own controller for its own set of DASDs. Also, the outboard controllers require additional electronics, power and packaging which adds cost and reduces overall system reliability.

Therefore there is a need for a less expensive and more scalable solution. A solution which enables a greater connectivity of hosts and storage arrays. It is desirable that such a system have a high availability and good performance.

SUMMARY OF THE INVENTION

The present invention solves one or more of the foregoing problems in the prior systems while providing a less expensive, more scalable solution. The present invention provides an architecture which uses host adapter cards which can reside in the host and can control numerous arrays.

A system is provided for storing data for a plurality of host computers on a plurality of storage arrays so that data on each storage array can be accessed by any host computer. A plurality of adapter cards are used. Each adapter has controller functions for a designated storage array. There is an adapter communication interface (interconnect) between all of the adapters in the system. There is also a host application interface between an application program running in the host computer and an adapter. When a data request is made by an application program to a first adapter through a host application interface for data that is stored in a storage array not primarily controlled by the first adapter, the data request is communicated through the adapter communication interface to the adapter primarily controlling the storage array in which the requested data is stored.

In a preferred embodiment, each host computer has one or more adapters where each adapter contains a RAID controller, one or more external interfaces, and a read and write cache. The disk drives are arranged in one or more arrays in a RAID scheme such as RAID0, RAID1, RAID3 or RAID5. At any given time each array is controlled by a single adapter and all accesses to the array flow through that adapter. This allows potential conflicts due to concurrent overlapping parity updates to be easily resolved. It also avoids the coherency problems that would result from storing multiple copies of the same data in multiple caches. The interconnect between the adapters allows for adapter-to-adapter (peer-to-peer) communication as well as adapter-to-disk communication.

In a preferred embodiment, there are also a plurality of adapters that have secondary control of each storage array. A secondary adapter controls a designated storage array when an adapter primarily controlling the designated storage array is unavailable. The adapter communication interface interconnects all adapters, including secondary adapters.

It is an object of the invention to allow for a high availability system which allows multiple hosts to access multiple arrays. An implementation using the loop topology of the Serial Storage Architecture (SSA), can have 128 hosts systems interconnected.

The host adapter cards can be compatible with many host buses, including a Microchannel or PCI bus for personal computers and workstations, which provides a less expensive and more scalable solution. In addition to the SSA interface, the fiber channel interface, FC-AL (Fiber Channel- Arbitrated Loop) can also be used with existing parallel interfaces such as SCSI2.

DETAILED DESCRIPTION OF THE INVENTION

Figure 3:
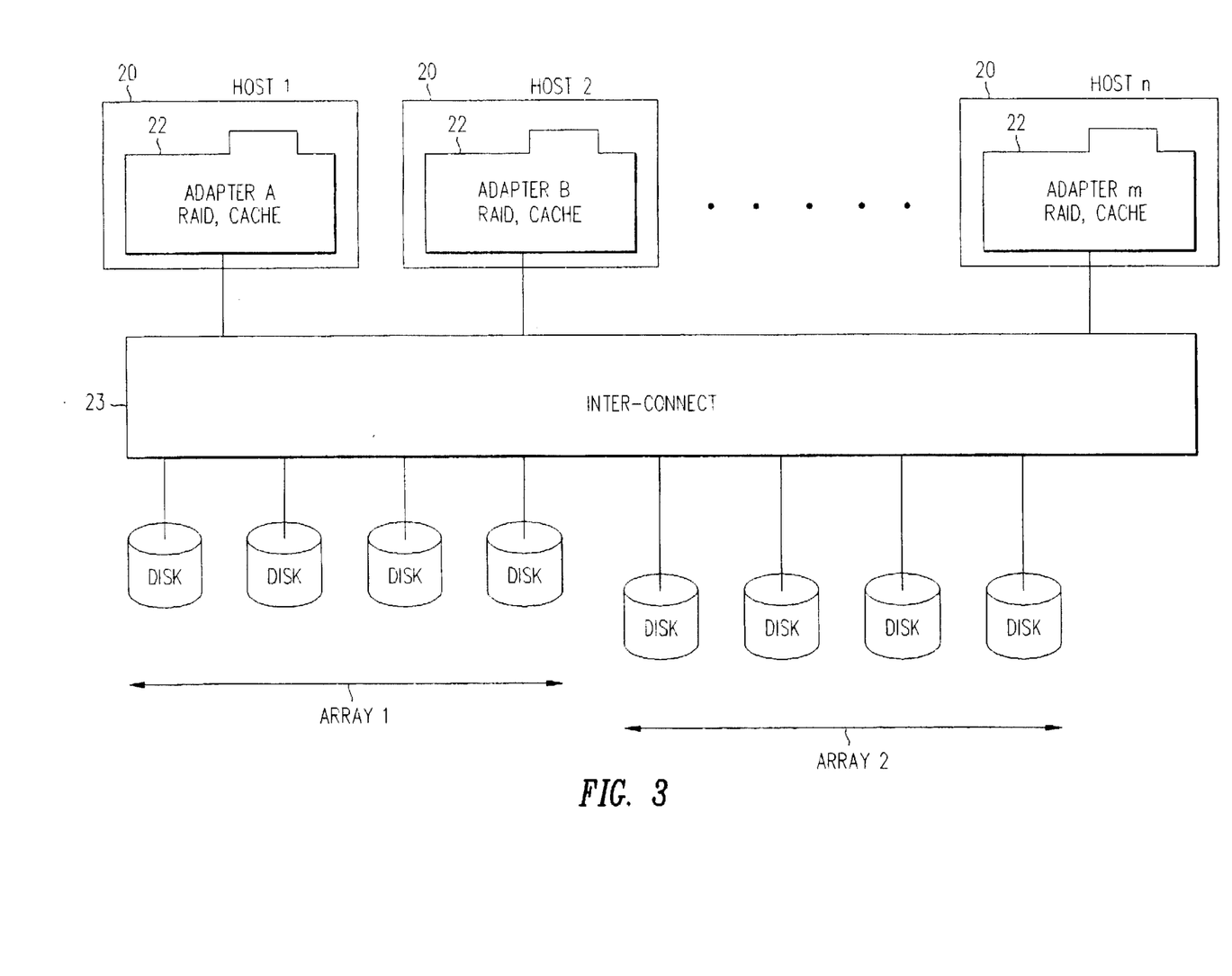
FIG. 3 is a block diagram of a logical view of the functions and operations of the invention.

FIG. 3 shows a logical view of the main elements of the functions and operations of the invention. Each host computer 20 has one or more adapters 22. Each adapter contains a RAID controller, one or more external interfaces, and a read and write cache. The host computers share a common pool of arrays of disk drives. The disk drives are arranged in one or more arrays, such as RAID 0, RAID 1, RAID 3 or RAID5, or a JBOD, which are systems well known by those skilled in the art. At any one time, each array is controlled by a single adapter and all accesses to the array flow through that adapter. This allows potential conflicts due to concurrent overlapping parity updates to be easily resolved. It also avoids the coherency problems that would result from storing multiple copies of the same data in multiple caches. Since each array is only controlled by one adapter, requests for an array that originate from an adapter, other than the controlling adapter for that array, must first be routed to the controlling adapter which will access the array and return the results to the original requestor. The adapters 22 are interconnected through an interconnect 23 to allow communication between adapters as well as adapter-to-disk communication.

An example of a host system is the IBM Risc System/6000 machine running the IBM AIX operating system. Many other hosts systems could be used that are well known to those skilled in this field.

Figure 4:
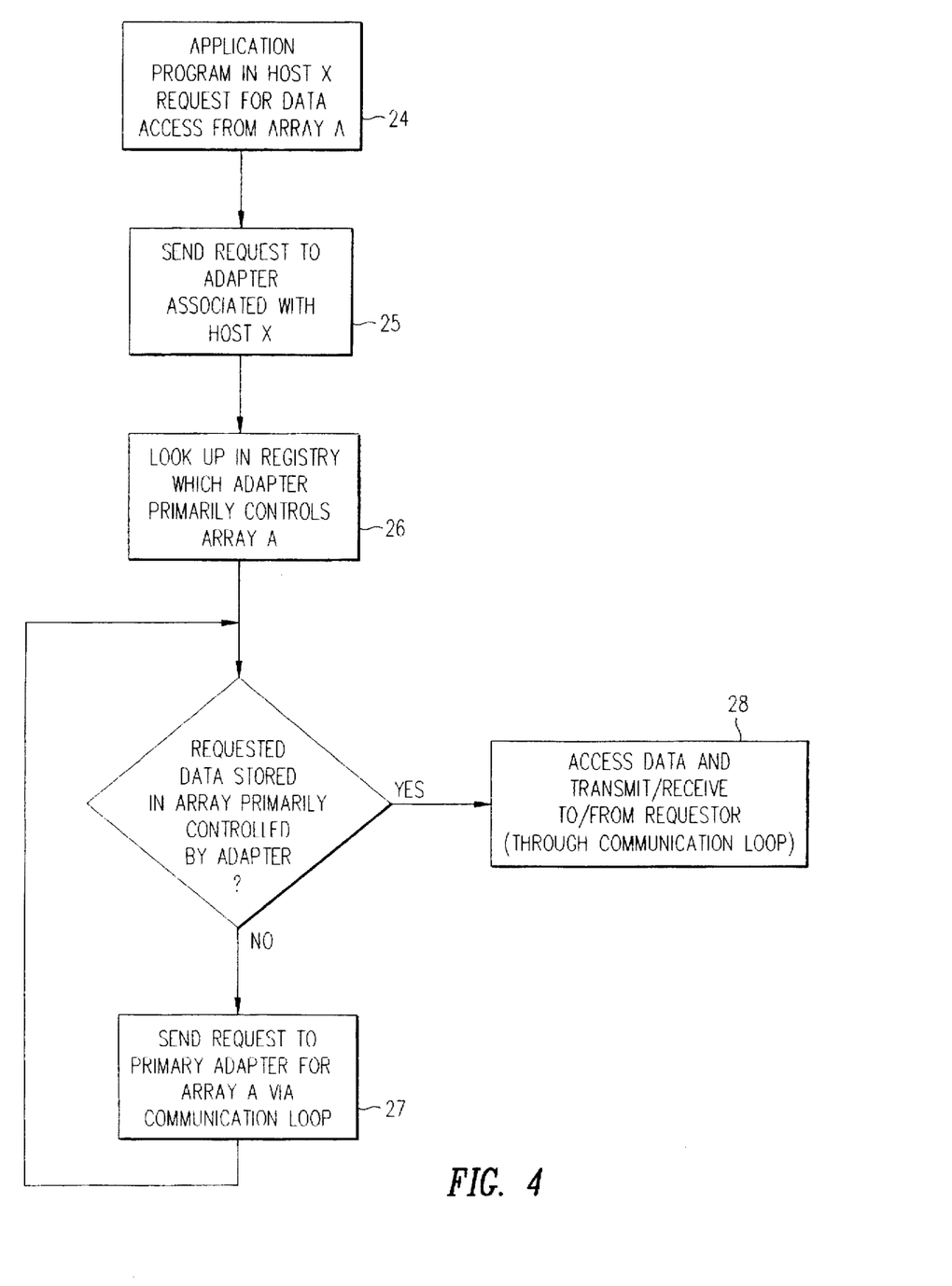
FIG. 4 is a flow chart showing the method for implementing the invention.

Referring to FIGS. 3 and 4, in a situation where host 1 wants to read data from array 2 which is controlled by adapter B 24, the host issues an I/O request to the adapter A 25. The adapter A consults a directory and determines that array 2 is controlled by adapter B 26. The originating adapter forwards the I/O request to adapter B 27. Adapter B executes the I/O request by searching its caches and accessing the disks if necessary. Adapter B then returns the read data to adapter A 28. Adapter A stores the read data in host memory and interrupts the host to indicate that the I/0 request is complete.

There are many implementations that can be used to provide the interconnectivity 23 depending on the band width, fan out, and availability required as is well know by those skilled in the art. For example there can be one or more parallel buses, serial loops or serial switches. The preferred embodiment of this invention is described with reference to the Serial Storage Architecture (SSA) as the interconnect architecture. However, other architectures could be used.

SSA is being developed by the American National Standards Institute (ANSI) X3T10.1. SSA is a serial interface specifically designed to connect I/O devices such as disk drives, tape drives, CD ROMs, optical drives, printers, scanners and other peripherals to workstation servers (host systems) and storage subsystems. Those skilled in the art are familiar with the implementation of the SSA architectures and therefore the architecture and its operation will not be described in much detail here. For a further explanation of SSA, see, "Information Technology—Serial Storage Architecture—Transport Layer 1 (SSA-TL1), ANSI X3T10.1/0989D", "Information Technology—Serial Storage Architecture—Physical 1 (SSA-PH1), ANSI X3T10.1/xxxD", and Information Technology—Serial Storage Architecture—SCSI-2 Protocol (SSA-S2P), ANSI X3T10.1/121D".

A link or bus refers to the connectors that are used to transmit data as signals over a transmission medium such as a copper wire. A serial link can use a single signal sized cable where the transmitted data units are serialized over the communication path. A serial connector typically has two way (full duplex) communication. When used in a loop configuration (as with disk arrays) the second path can be used to double the bandwidth to each drive in the loop or provide an alternate route to a drive when a connection has failed. SSA provides a two signal connection (transmit and receive) providing full duplex communication.

SSA uses the logical aspects of the SCSI (small computer system interface) specifications for addressing the serially attached peripherals. These SCSI specifications are mapped to the physical specifications of SSA. That is, SSA can be used as a transport layer for various upper-level protocols, in particular SCSI-2 for storage applications. SCSI-2 on SSA maintains a similar address scheme as defined in the SCSI standard where there are initiators, targets and logical units.

The most basic SSA network consists of a single port host adapter connected to a single port peripheral. The serial connection consists of four wires used to communicate frames of information. Four lines consist of a plus/minus line out (transmit) and a plus/minus line in (receive). A "port" refers to a gateway that consists of hardware and firmware to support one end of a link (one transmit path and one receive path). A port in one node connects to a port on another node via a link.

A port in SSA is capable of carrying on two 20 megabyte per second conversations at once, one inbound and one outbound. Each link in the loop operates independently thus the aggregate loop band width can be higher then a single link. The loop is also tolerant to a single fault since messages and data can travel either clockwise or counter clockwise. An SSA dual port node is capable of carrying on four simultaneous conversations for a total bandwidth of 80 megabytes per second.

A node refers to a system controller, host, or a peripheral device, with one or more serial ports. Each node has a function which is its specific responsibility or task. An initiator is the function within a node that determines what task needs to be executed and which target will perform the desired task. A node implements one or more ports.

A frame is the basic unit of information transmission between two ports in an SSA network. A frame has an expected format consisting of a control byte, up to six bytes of address, up to 128 bytes of data, and four bytes of error detection. A node can route frames between ports. A node function may originate or transmit frames. The SSA protocol uses special characters to pace the flow of frames transmitted between nodes and to acknowledge frames. Frame multiplexing capability means that the system of telegraphy allows two or more messages to be sent concurrently in either direction over the same cable.

SSA can be implemented with multiple topologies including string, loop and switch configurations. In a typical single loop arrangement, 128 dual-port nodes (peripherals or hosts), can be supported. In a complex switch configuration the theoretical maximum number of nodes would be over two million. The loop topology allows alternate paths to each node in network and eliminates the network as a single point of failure.

A gateway is established between two nodes to provide full duplex communication over the SSA network. A node will issue a transaction to another node to perform a function such as accessing disks. A gateway consists of two connections, one in each direction. The master (the one issuing the transaction) builds a master control block. The gateway sends the transaction over the network in frames. The slave side of the gateway receives the transaction frames and builds a task control block which calls the addressed service.

Figure 5:
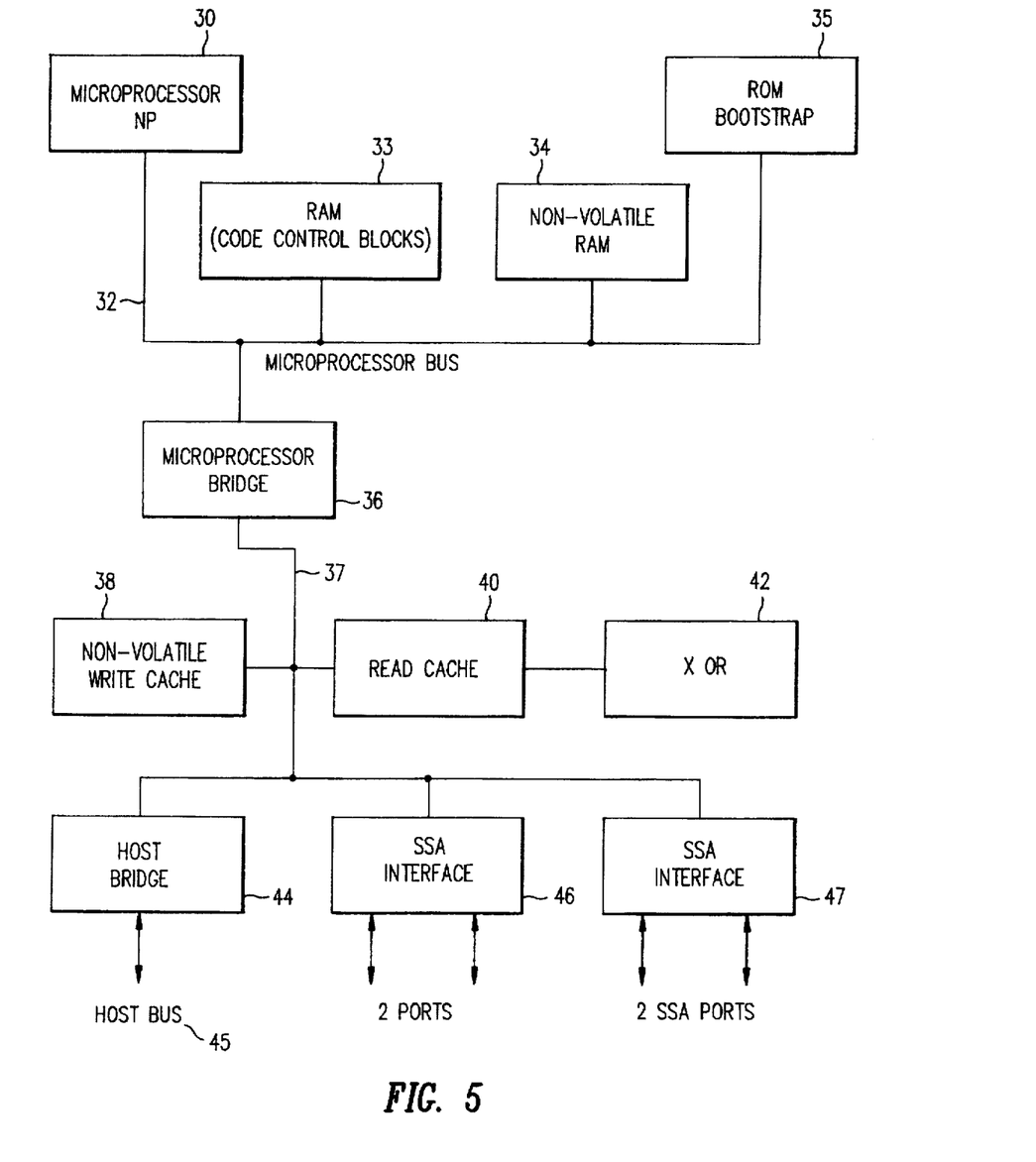
FIG. 5 is a block diagram of the hardware for the adapter card implementing the invention.

FIG. 5 shows a block diagram of the adapter card hardware. The adapter has a microprocessor 30 connected over a microprocessor bus 32 to a RAM 33, which contains the necessary code and control blocks (described in more detail in the FIG. 6), and to a non-volatile RAM 34 and ROM bootstrap 35. A microprocessor bridge 36 connects the microprocessor 30 over a local bus 37 to a non-volatile cache 38 and a read cache 40. XOR hardware 42 is also provided to perform the RAID parity calculations. A host bridge 44 provides a connection to the main host hardware through a host interface such as a microchannel or PCI bus 45. There are two SSA dual port chips 46 and 47, one for interconnection with other adapters and one for interconnection with an array of storage devices. Each block can be a separate ASIC (application specific integrated circuit). The XOR function can be combined with the read cache controller on one ASIC.

Figure 6:
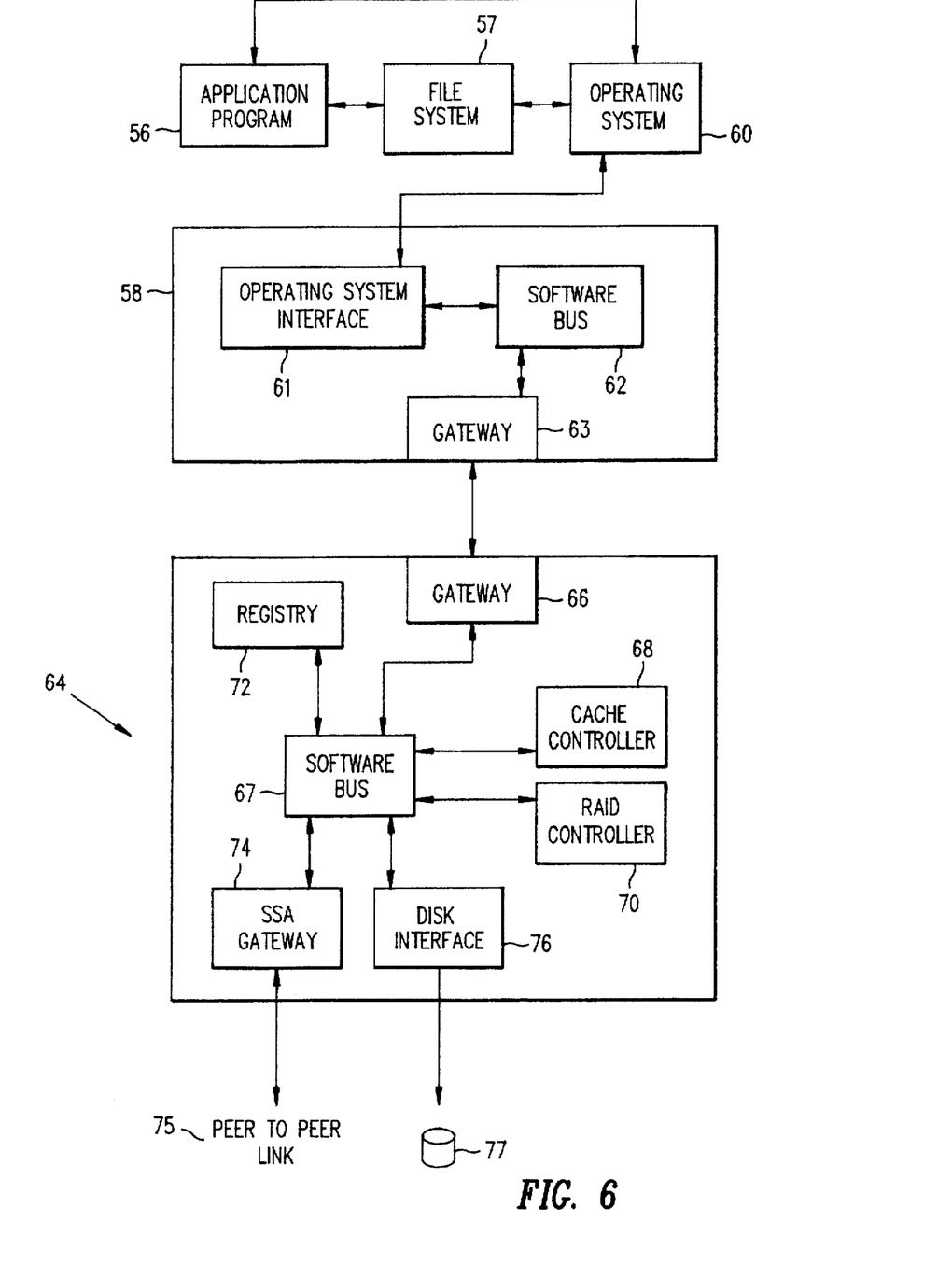
FIG. 6 is a block diagram showing the software for implementing the invention.

FIG. 6 provides a block diagram overview of the software running on the host and the adapter card to implement the invention. A host system has a central processing unit (CPU) (not shown) and a RAM (not shown) in which software is stored during execution. An application program 56 running in the RAM makes an I/O request to the file system 57 or directly to a device driver 58 through an operating system 60. The device driver has an interface to the operating system 61, a software bus 62, and a gateway 63 to the adapter card.

The adapter card 64 has its own microprocessor and its own RAM containing, during execution, the software to implement the invention (see FIG. 5 for further details of the hardware in the adapter). The adapter card has a gateway 66 for interacting with the device driver and a software bus 67 which interacts with a cache controller 68 and a RAID controller 70. The adapter also has a registry 72 which identifies the array of storage devices primarily controlled by the adapter card and the arrays that are accessible via other adapter cards. The software bus also interacts with a gateway 74 which enables, through an interface chip, the peer-to-peer link 75 with the other adapter cards. The disk interface 76 interacts with the disk array 77.

In order to increase the connectivity to the arrays, each array is provided with a primary and secondary (back-up) controlling adapter. Since all the disks in a loop are connected to both adapters, when both adapters are functioning a request to access an array primarily controlled by the other adapter is first routed to the other adapter for processing through the peer-to-peer link 75. The results are then passed back to the requesting adapter, again through peer-to-peer link 75, and returned to the host.

Figure 7:
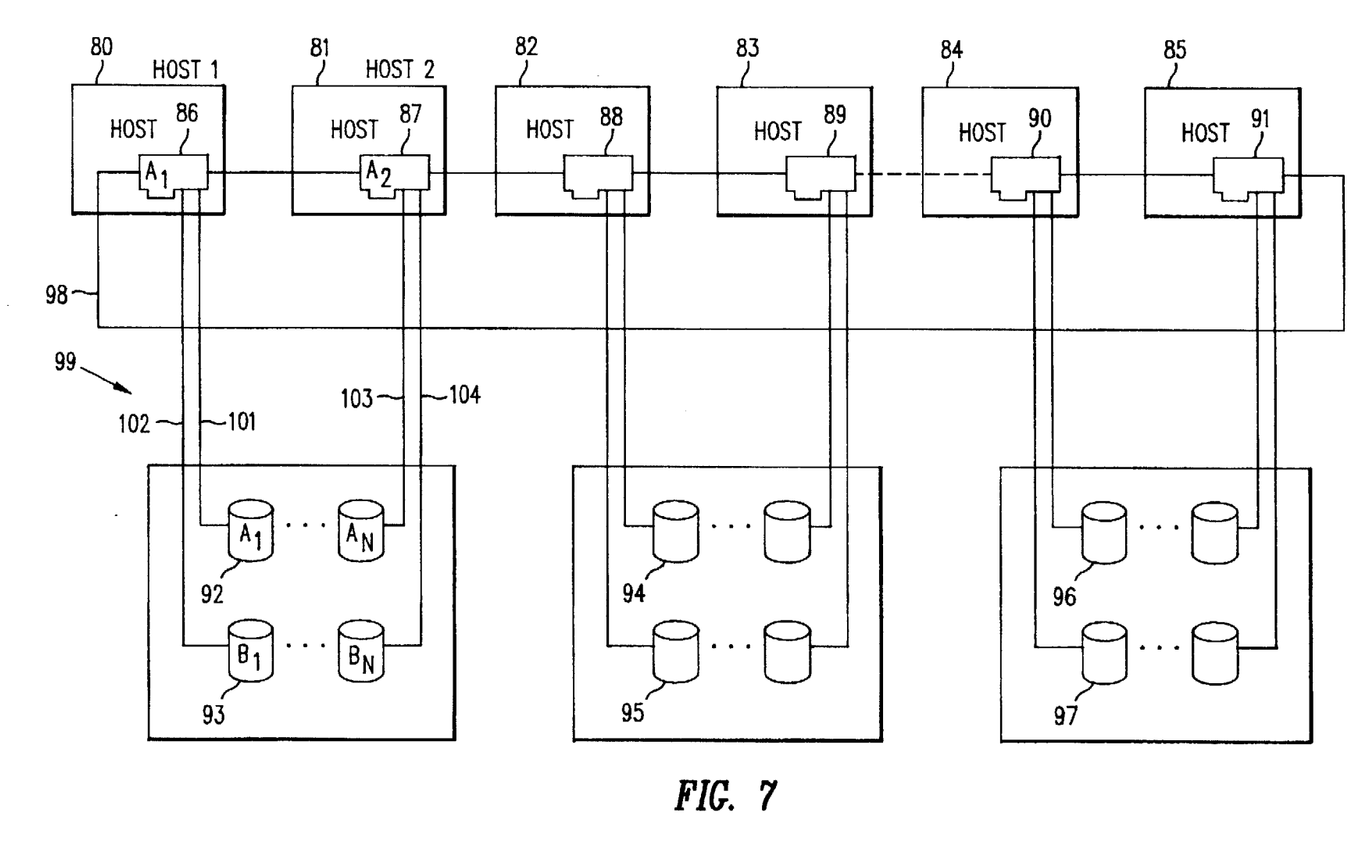
FIG. 7 is a block diagram showing a first implementation of the invention.

In one configuration an adapter can be the primary controlling adapter for one array and the secondary controlling adapter for another array when they are on the same SSA disk array loop. Referring to FIG. 7, each host 80–85 has one adapter card 86–91 which acts as either a primary or secondary adapter for a disk array 92–97. While only six host computers are shown, as mentioned previously, there can be many more interconnected hosts. Each array 92–97 has a primary and secondary adapter to act as controller for that array. For example, adapter A1 (86) is the primary controller for array A (92) and is the secondary adapter for array B (93). Adapter A2 (87) is the primary controller for array B and the secondary adapter for Array A (92). The adapters are all interconnected through an SSA loop 98. Pairs of arrays, such as Array A and Array B are connected through an SSA device loop 99. When the primary adapter is active the I/O requests are directed through the primary adapter. In the event the primary adapter card fails, the other hosts can still access the disk array through the secondary adapter.

Figure 8:
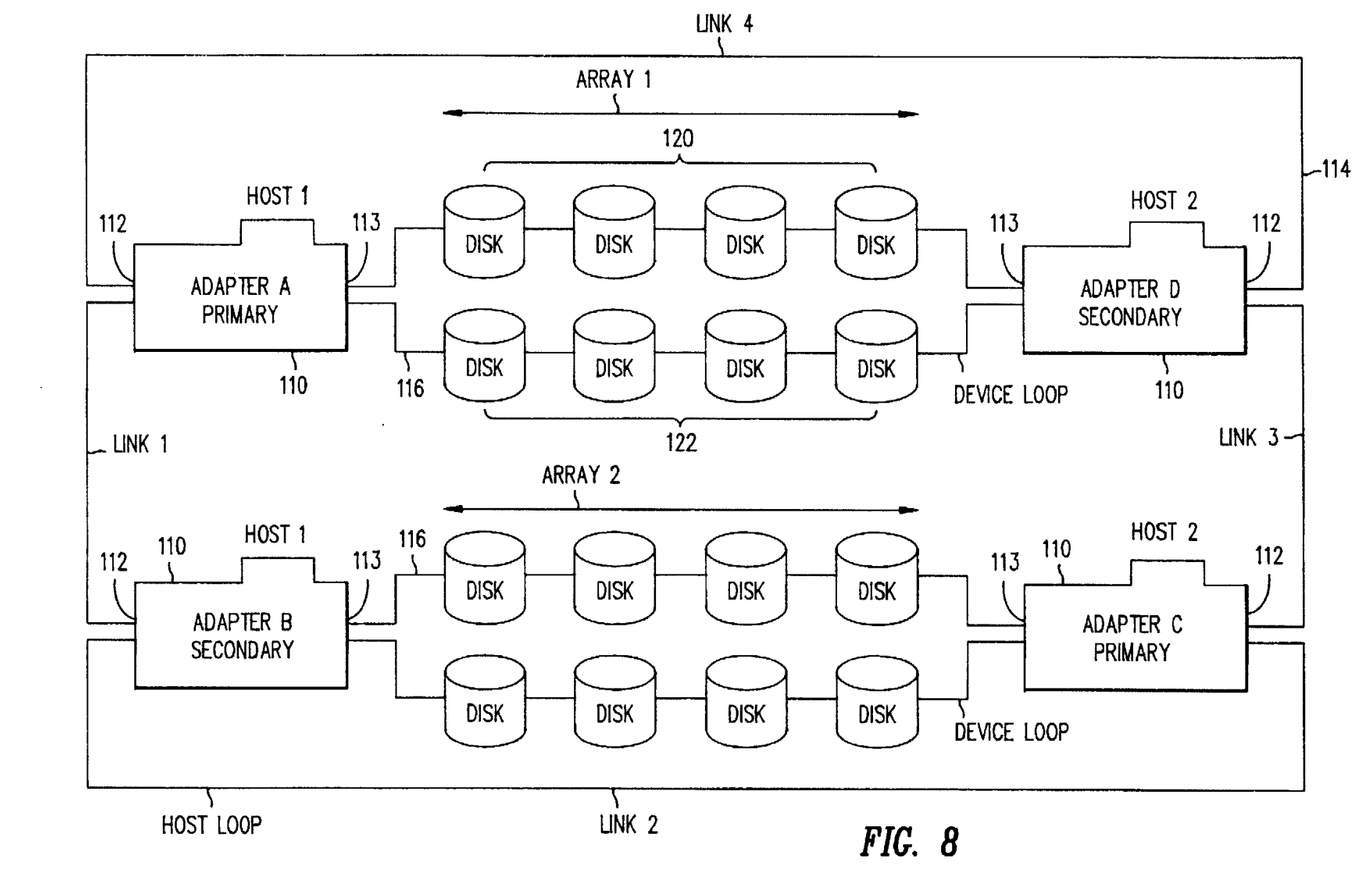
FIG. 8 is a block diagram showing a second implementation of the invention.

The system can be configured with no single point of failure by including multiple adapters in each host computer and alternate paths through the interconnect, such as a loop or dual switches. FIG. 8 illustrates a high availability configuration implementing three SSA loops. Each adapter card 110 contains two dual port SSA nodes 112, 113. One node 112 is connected into the outer loop which is the host loop 114. This loop is used only for communications between the originating adapter and the primary adapter. The other node 113 is connected into one of the two inner loops, the device loops 116. Each device loop provides communication between the primary adapter and the disks in the corresponding arrays. It is also used for communication between the primary adapter and the secondary adapter.

Referring to FIG. 8, adapter A has primary control of array 1, adapter D has secondary control of array 1, adapter B has primary control of array 2 and adapter C has secondary control of array 2. I/O requests generated by host 1 for array 1 are issued directly to adapter A. Adapter A then translates these into disk read/write commands. I/O requests generated by host 1 for array 2 are issued via adapter B and link 2 to adapter C. Adapter C then translates these into disk read/write commands. Similarly I/O requests generated by host 2 for array 2 are issued directly to adapter C. Adapter C translates these into the disk read/write commands. I/O requests generated by host 2 for array 1 are issued via adapter D and link 4 to adapter A. Adapter A then translates these into disk read/write commands. In the example shown the disks are configured as 2 RAID5 arrays such as a 7+P (7 data disks and 1 parity disk) configuration with distributed parity. The disks are packaged in an external enclosure with fault tolerant power and cooling.

Alternatively, the disks could be configured as eight RAID1 arrays. In this case one disk of each array could be packaged in each host computer. Also, the adapters can act as primary controlling adapters for one array and secondary controlling adapters for a second array when the arrays are in the same device loop. For example, if there were two 3+P RAID 5 arrays connected in the device loop between adapter A and adapter D. Adapter A has primary control of the top group of drives 120 forming one 3+P array, and secondary control of the lower group of drive 122 forming a second 3+P RAID 5 array, and adapter D has primary of the lower group 122 and secondary control of the upper group 120. Also, a host can have more than two adapter.

If an adapter goes down, its operations are taken over by a secondary adapter. The host can still access any of the arrays through its other adapter.

When an adapter goes down, any remote I/O requests that were in progress on the adapter are terminated with an error by the SSA gateway in the originating adapter card. The module that forwarded the transaction then waits for several seconds in the hope that the secondary adapter will broadcast that it has taken over the array. The failed transaction can then be resent to the secondary adapter.

The SSA addressing capabilities allow the host loop to be expanded up to 128 adapters. With a large number of adapters the host loop is the ultimate bandwidth limitation since it is shared by nearly all I/O requests. Assuming a random distribution of requests, on average, each request will have to travel almost a half of the way around the loop so the aggregate band width available is 2×20 or 40 megabytes per second full duplex. To avoid a possible deadlock SSA frames must not be routed through one link or one node of the loop. In the case where there is a one-to-one ratio of read to writes the total I/O band widths is 80 megabytes per second, neglecting overheads. Higher band widths can be achieved by replacing the host loop with a multiport SSA switch.

In the configuration shown in FIG. 8 only some of the transactions that are received on any one adapter card will be processed by the RAID software on that card. Transactions that are destined for a remote resource are routed through the SSA gateway. The SSA gateway provides a node number to address each remote adapter that it finds.

Each disk that is part of an array is assigned to a controlling adapter. This is known as the disk's primary adapter. Each disk is in a loop with only two adapters. Each adapter is assigned a node number. This number is supplied by the host and can be thought of as a unique identifier. When an array is created the disks are automatically marked with the node number of the adapter being used to create the array. The disks are also marked with the node number of the other adapter in the loop. The other adapter is the arrays backup adapter, referred to as the secondary adapter. In normal operations the primary adapter runs the RAID code which controls the disks in the array. The secondary adapter only maintains duplex copies of the write cache and the non-volatile memory as instructed by the primary adapter (as described below). If it detects a failure then the secondary adapter takes over the operation of the primary adapter.

Figure 9:
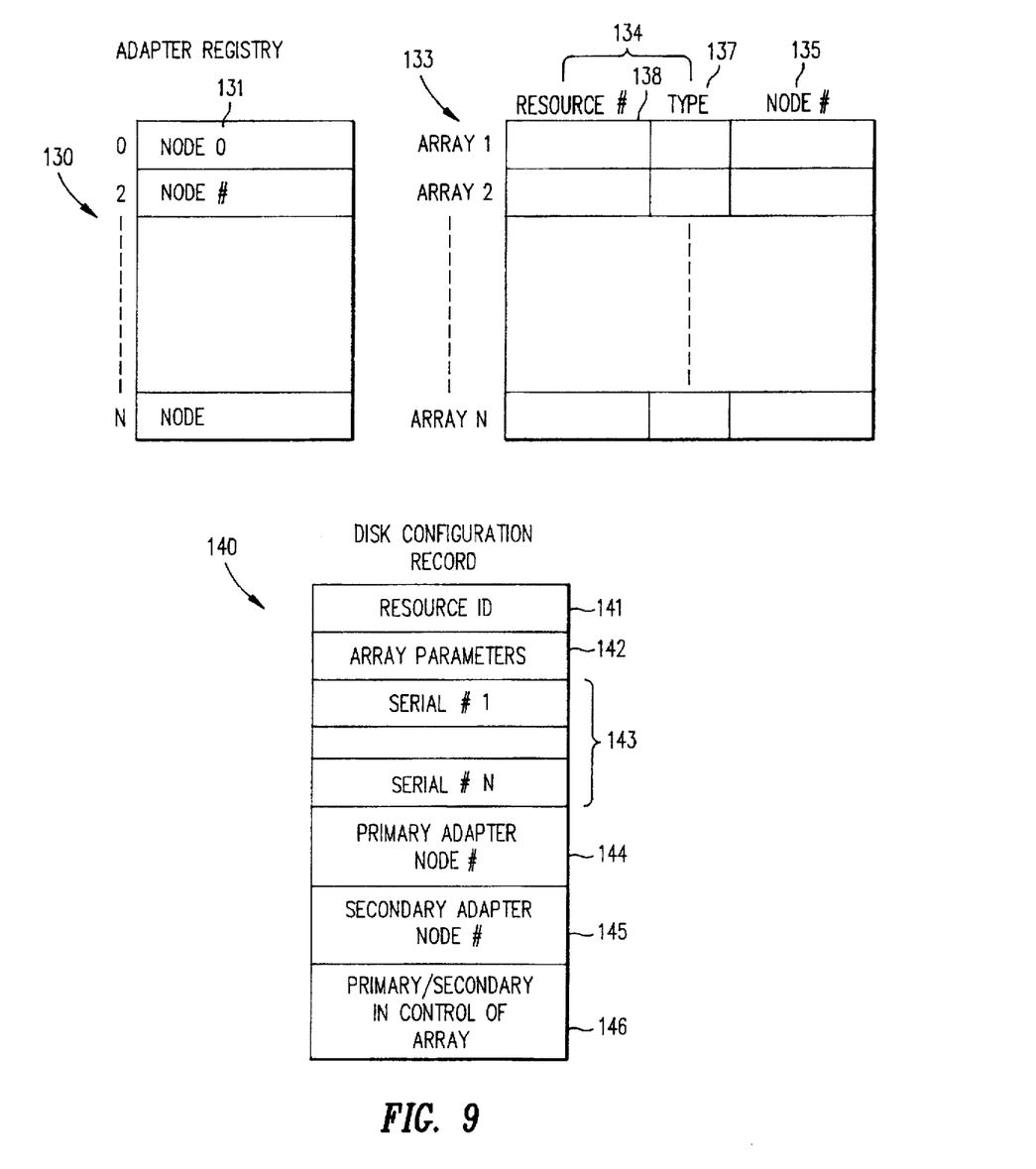
FIG. 9 is a diagram of tables stored in the registries of the adapters and in the storage devices.

Each adapter card contains a registry, which is a central service accessible via the software bus. The registry maintains a list of all the adapters and a list of all of the arrays in the system. Referring to FIG. 9, each entry in the adapter list 130 contains a node number 131.

Each entry in the array list 133 contains a Resource ID 134 and the Node Number 135 of the adapter currently controlling that array (primary or secondary). The resource ID is used by the device driver to open the array for reading and writing. It consists of a Type field 137 and a Resource Number 138. The Type field specifies the array type, eg RAID level 0, 1, 3, or 5. The Resource Number is a unique identifier which is assigned when the array is configured.

Each DASD stores a Configuration Record 140 which is created when the parent array is configured. The Configuration Record stores the Resource ID 141, the array parameters 142 (e.g. stripe size), the serial numbers of the other DASDs in the array 143, the primary adapter Node 144, and the secondary adapter node 145. All of these are assigned manually using a host configuration utility. The configuration record also contains a flag 146 to indicate whether the primary or secondary adapter is currently controlling the array. This flag is managed by the registries in the primary and second adapters, as described previously.

When building the registry, the adapter examines the primary node number on each disk that is part of an array and if it belongs to the adapter, then it passes the disk onto the RAID firmware. If the adapter is not the primary controller for a particular disk, then it Pings the other adapter to determine whether it is operating. If the other adapter is not operating, then the first adapter takes over as array controller for that disk. This is referred to as fail-over. The registry makes the disks fail-over from one system to another. Fail-over occurs when an adapter sees that the other adapter has made the transition from a working adapter to a failed state. When this occurs the fail-over is performed. All disks to be switched over are locked, for example with a SCSI reserve command. A flag is then changed on each disk to indicate that the disk is to be maintained by the secondary adapter rather than the primary. All the disks can then be released. If one of the disks cannot be reserved then the reservation is released from all the disks that have been reserved so far. The process is backed off and retried after a random period. If an error should still occur after the reservation period then all the flags are returned to their primary state and the process itself is backed off and retried. If the power fails during this process then when the power is restored, both adapters will notice the inconsistency and by default set all the disks to the primary adapter.

Fail-back is the reverse of the foregoing fail-over procedure. This occurs when both adapter cards are working. The process is initiated by the secondary adapter which periodically Pings (signals) the primary adapter to determine whether it has recovered. When the Ping is successful, the registry on the secondary adapter informs its RAID controller of each disk that it wants to give back to the primary adapter, specifying that the disk should be released. The RAID controller in the secondary adapter first closes the array which includes the specified disks and then it closes the disk itself. When all of the disks in an array are closed, the registry in the secondary adapter locks them as described earlier and switches the flag back so they are again controlled by the primary adapter. The secondary adapter then releases the disks and informs the registry in the primary adapter that the fail-back process has been completed.

In order for the system to be powered off without an unwanted fail-over occurring, the system first closes all of the arrays that it has open and informs the adapter card's registry of the close down. The registry on the primary adapter then informs the registry on the secondary adapter that it is being closed down. This causes the registry on the secondary adapter to reset the flag that says it has seen the primary adapter working. As a fail-over can only occur when the secondary sees a transition of the primary adapter from working to failed, the subsequent power down of the primary will not cause a fail-over.

The disk arrays are arranged in a SSA loop between a primary and secondary adapter. If a link fails between a disk or between a disk and an adapter, all of the disks are still accessible to both adapters, since the transmissions can be routed in both directions through the loop. So, with reference to FIG. 7, if link 101 fails, adapter A1 (86) can still reach array A (92) by sending the transmission through link 102 to link 104 through adapter card A2's interface chip to link 103. This transmission to adapter card A2 is never processed by the software in adapter card A2. The SSA chip detects that the message is to route frames for the other array in the loop and the request is sent on to that array. This also applies the SSA chips in array B (93).

The foregoing process is referred to as cut-through routing. It is a standard function in the SSA transport layer. Cut through routing is also used to transfer a data access request from an originating adapter to the controlling adapter for the array. Each dual port node (adapter or disk drive) has a hardware router in the SSA chip. The router inspects the first byte of the address field to determine whether to forward the frame to the next node in the loop. The originating adapter merely has to put the path address of the primary adapter in the frame address field when sending the request over the loop.

The path is determined at system power-on. An initiator adapter 'walks' the network to determine the configuration and build the configuration table which has an entry for each node. Each entry also contains the path address of that node. If there are alternate paths, the initiator generally chooses the one using the fewest links. This can change if a link becomes disconnected.

The device driver identifies the array containing the requested data. The device then queries the registry on an adapter to determine which arrays are locally controlled. When a host has more than one adapter, the device driver sends the request to the adapter that primarily controls the array with the requested data (if locally controlled). Otherwise, for remote arrays, the device driver tries to balance the load between the adapters, by addressing half of the arrays via each adapter or by sending alternate requests via each adapter.

The contents of the non-volatile RAM are mirrored by the primary adapter into the non-volatile RAM of the secondary adapter. The RAID modules do this via the SSA gateway and the non-volatile RAM manager on the secondary adapter card.

In normal operation the primary adapter uses the device loop to maintain a duplex copy of it's write cache in the secondary adapter, similarly for the meta data that indicates which region of the array is being updated. This allows fail over from the primary to the secondary without loosing the data in the write cache or corrupting the array.

When the primary adapter executes a write command it also sends a copy of the data to the write cache in the secondary adapter. When the primary adapter is to destage data from the write cache to disk, it sends a message to the secondary adapter to indicate which region of the array is being updated. Both adapters normally store this information in non-volatile memory to protect against power failure before the destage completes. When the primary adapter has destaged the data and updated the parity, it sends a second message to the secondary adapter. The secondary adapter then expunges the corresponding records from its write cache and non-volatile memory.

While the invention has been particularly shown and described with reference to the preferred embodiment, it will be understood that various changes of form and detail may be made without departing from the spirit and scope of the invention as defined by the appended claims.

We claim:

1. A system for storing data for a plurality of host computers on a plurality of arrays of storage devices, so that data on any storage device can be accessed by any host computer, comprising:

a plurality of adapters, each adapter being associated with a host computer and each adapter having primary control of a designated array;

an adapter communication interconnect between the adapters for peer to peer communication, wherein a data access request from a host computer to an associated adapter for an array not primarily controlled by the adapter is communicated through the adapter communication interface to the adapter having primary control of the array; and a plurality of secondary adapters, each secondary adapter being associated with a host computer and each secondary adapter having secondary control of a designated array, wherein a secondary adapter controls a designated array when an adapter primarily controlling the designated array is unavailable, and wherein an adapter having primary and an adapter having secondary control of a designated array reside in different host computers.

2. The system of claim 1, further comprising an identifier stored in each adapter for indicating the storage devices primarily controlled by the adapter.

3. The system of claim 1, further comprising an identifier stored in each storage array for identifying an adapter having primary control of the storage array.

4. The system of claim 1, wherein each adapter resides in a host computer.

5. The system of claim 1 further comprising:

RAID controller functions included in the adapter for distributing data stored in an array according to a RAID scheme.

6. The system of claim 1, wherein the adapter communication interface is an SSA interface.

7. The system of claim 1, wherein a first host computer has a first adapter primarily controlling a first array and a second adapter secondarily controlling a second array; and a second host computer has a third adapter for secondarily controlling the first array and a fourth adapter for primarily controlling the second array.

8. A system for storing data for a plurality of host computers on a plurality of arrays of storage devices, so that data on any storage device can be accessed by any host computer, comprising:

a plurality of adapters, each adapter being associated with a host computer, each adapter having primary control of a first array and having secondary control of a second array, wherein a secondary adapter controls a designated array when a primary adapter primarily controlling the designated array is unavailable and wherein a first adapter has primary control of a first array and secondary control of a second array, and a second adapter has primary control of the second array and secondary control of the first array; and an adapter communication interconnect between the adapters for peer to peer communication, wherein a data access request from a host computer to an associated adapter for an array not primarily controlled by the associated adapter is communicated through the adapter communication interface to the adapter having primary control of the array.

9. The system of claim 8 wherein the first and second adapter are in the same host computer.

10. A method for accessing data for a plurality of host computers on a plurality of storage arrays, comprising the steps of:

a) associating at least one adapter with each host computer;

b) associating a first adapter, associated with a first host, as a primary controller for a first storage array;

c) associating a communication interconnect between all of the adapters;

d) sending a data access request from the first host to the first adapter associated with the host;

e) identifying whether requested data is stored in the first storage array primarily controlled by the first adapter;

f) sending a data access request, through the communication interconnect, for the requested data not stored in the first storage array primary controlled by the first adapter to an adapter primarily controlling the storage array having the requested data;

g) associating the first adapter as a secondary controller for a second storage array said secondary adapter residing in a different host computer than the host computer having the adapter primarily controlling the second storage array;

h) determining when the first adapter primarily controlling the first storage array is unavailable; and i) using a second adapter having secondary control for the first storage array as a controller for the first designated storage array when the first adapter having primary control of the first designated storage array is unavailable.

11. In a networked computer system comprising a plurality of host computers and a plurality of storage arrays, wherein each host computer has an adapter card therein, each adapter card primarily controlling a first storage array and secondarily controlling a second storage array, and having a communication interconnect between all of the adapter cards in the system, a computer program product for use with the adapter cards, comprising:

a computer usable medium having computer readable program code means embodied in said medium for providing access for all of the host computers to data stored on the plurality of storage arrays, said computer program product having:

computer readable program code means for a first adapter card associated with a first host computer receiving a data access request from the first host computer;

computer readable program code means for identifying whether requested data is stored in the storage array primarily controlled by the first adapter;

computer readable program code means for sending the data access request, through the communication interconnect, for data not stored in the storage array primary controlled by the first adapter to the adapter card primarily controlling the storage array having the requested data; and computer readable program code means for enabling a secondary adapter residing in a second host computer to take over control of the first array for the first primary adapter when the first primary adapter fails.

12. An article of manufacture for use in a networked computer system comprising a plurality of host computers and a plurality of storage arrays, wherein each host computer has at least one adapter therein, each adapter card primarily controlling a first storage array and secondarily controlling a second storage array, and having a communication interconnect between all of the adapter cards in the computer system for providing access for all of the host computers to data stored on the plurality of storage arrays, the article of manufacture having a computer program order embodiment in said medium which causes the computer system to:

send a data access request from a first host computer to a first adapter associated with the first host computer;

identify whether requested data is stored in a first storage array primarily controlled by the first adapter;

send the data access request, through the communication interconnect, for the requested data not stored in the first storage array primary controlled by the first adapter, to an adapter primarily controlling the storage array having the requested data;

determine when the first adapter primarily controlling the first storage array is unavailable; and use a second adapter having secondary control of the first storage array as a controller for the first designated storage array when the first adapter having primary control of the first designated storage array is unavailable.

* * * * *